No. 816,912. PATENTED APR. 3, 1906.
J. O. HEINZE, Jr.
DYNAMO MAGNETIC POWER TRANSMISSION DEVICE.
APPLICATION FILED APR. 17, 1905.

4 SHEETS—SHEET 1.

No. 816,912. PATENTED APR. 3, 1906.
J. O. HEINZE, JR.
DYNAMO MAGNETIC POWER TRANSMISSION DEVICE.
APPLICATION FILED APR. 17, 1905.

4 SHEETS—SHEET 2.

Witnesses:
Inventor:

No. 816,912. PATENTED APR. 3, 1906.
J. O. HEINZE, Jr.
DYNAMO MAGNETIC POWER TRANSMISSION DEVICE.
APPLICATION FILED APR. 17, 1905.
4 SHEETS—SHEET 3.
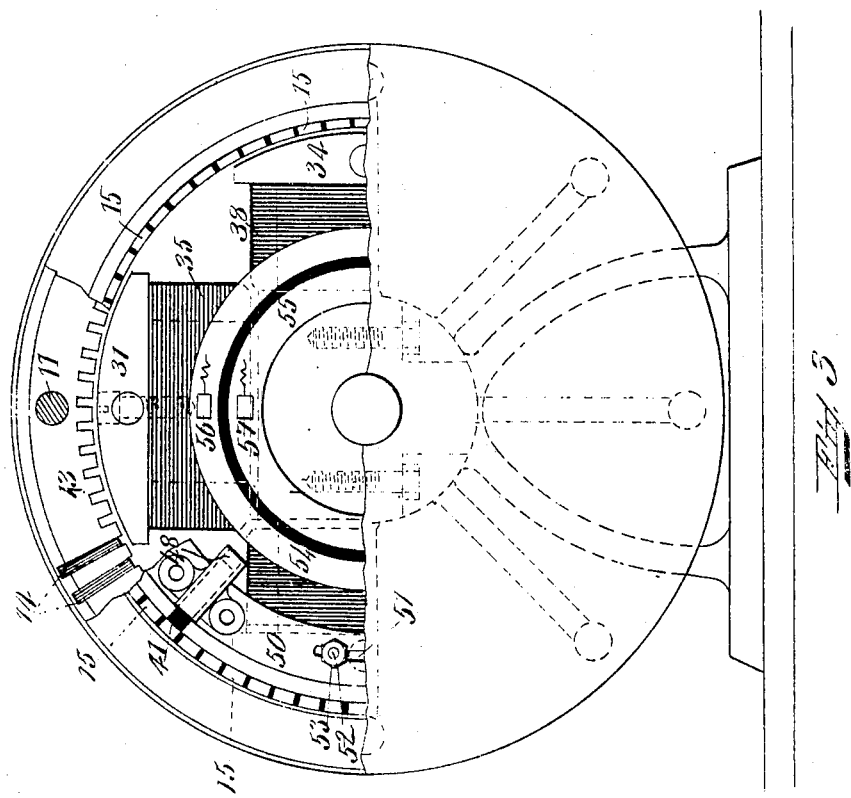

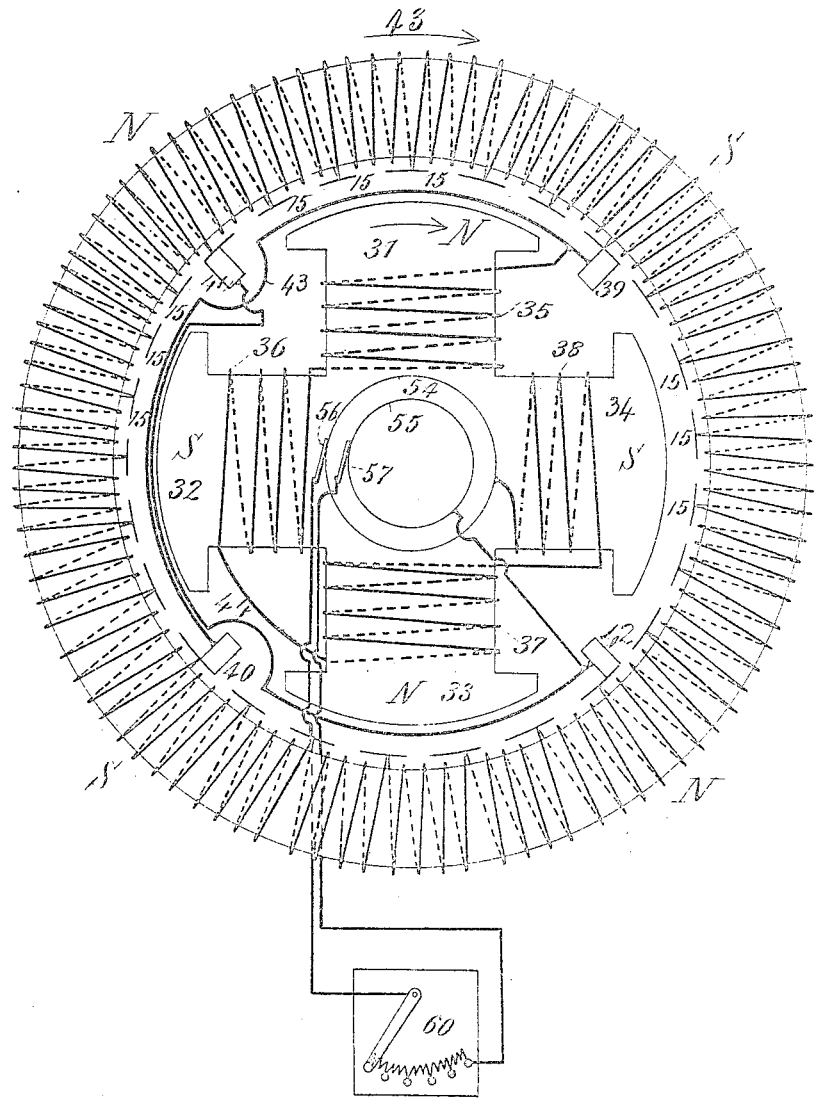

UNITED STATES PATENT OFFICE.

JOHN OTTO HEINZE, JR., OF LOWELL, MASSACHUSETTS.

DYNAMO-MAGNETIC-POWER TRANSMISSION DEVICE.

No. 816,912.　　　　Specification of Letters Patent.　　　Patented April 3, 1906.

Application filed April 17, 1905. Serial No. 255,921.

*To all whom it may concern:*

Be it known that I, JOHN OTTO HEINZE, Jr., a citizen of the United States, residing at Lowell, in the county of Middlesex and State of Massachusetts, have invented a certain new and useful Dynamo-Magnetic-Power Transmission Device, of which the following is a specification.

My invention relates to means for transmitting power from a driving device to a driven device. Its principal objects are, first, to provide means whereby a driving-shaft can without mechanical means be operatively connected with and then disconnected from a shaft to be driven, and, second, to provide means whereby during operation the speed of one shaft can be varied from the speed of the other.

The first feature of my invention consists of a driving-shaft, a driven shaft, an armature, and a field of a dynamo-machine, one shaft being fixed to the armature and the other shaft being fixed to the field.

The second feature resides in means for varying the electrical current passing through the field and armature.

By means of my invention all mechanical friction between the driving-shaft and the driven shaft and also all variable-speed gearing, clutch mechanisms, and the like are eliminated, as are also shocks and jolting of parts due to sudden startings of the driving device or shaft, all of which eliminations render apparatus employing my invention of great utility—as, for example, when it is used in the driving mechanism, say, of automobiles making use of any kind of power. Further, as the field and armature generate an abundance of electrical energy all batteries may be discarded and a portion of the energy generated may be used to operate sparkplugs of a gasolene-engine, electric headlights, and other electrical devices.

Figure 1:
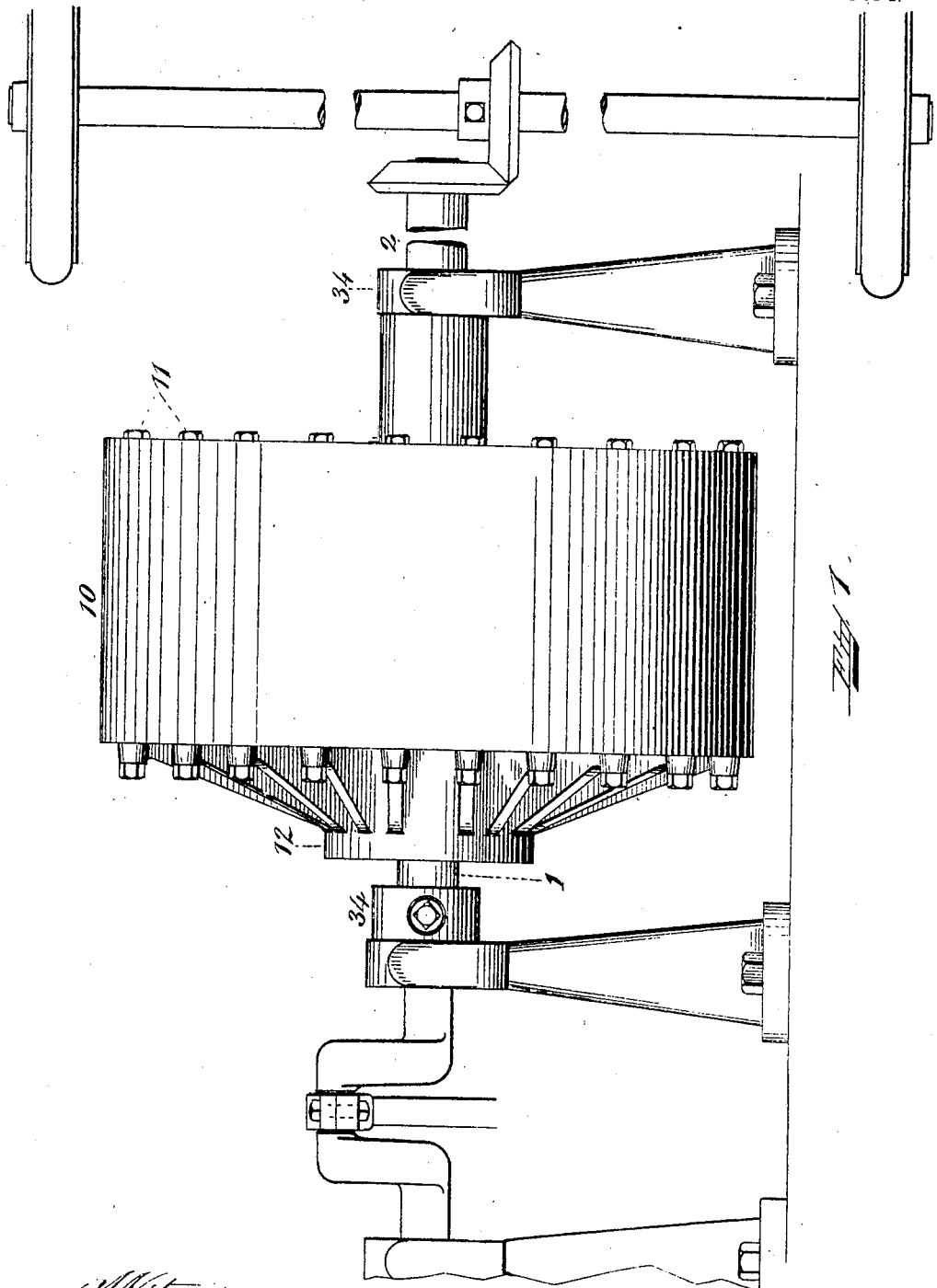
Figure 2:
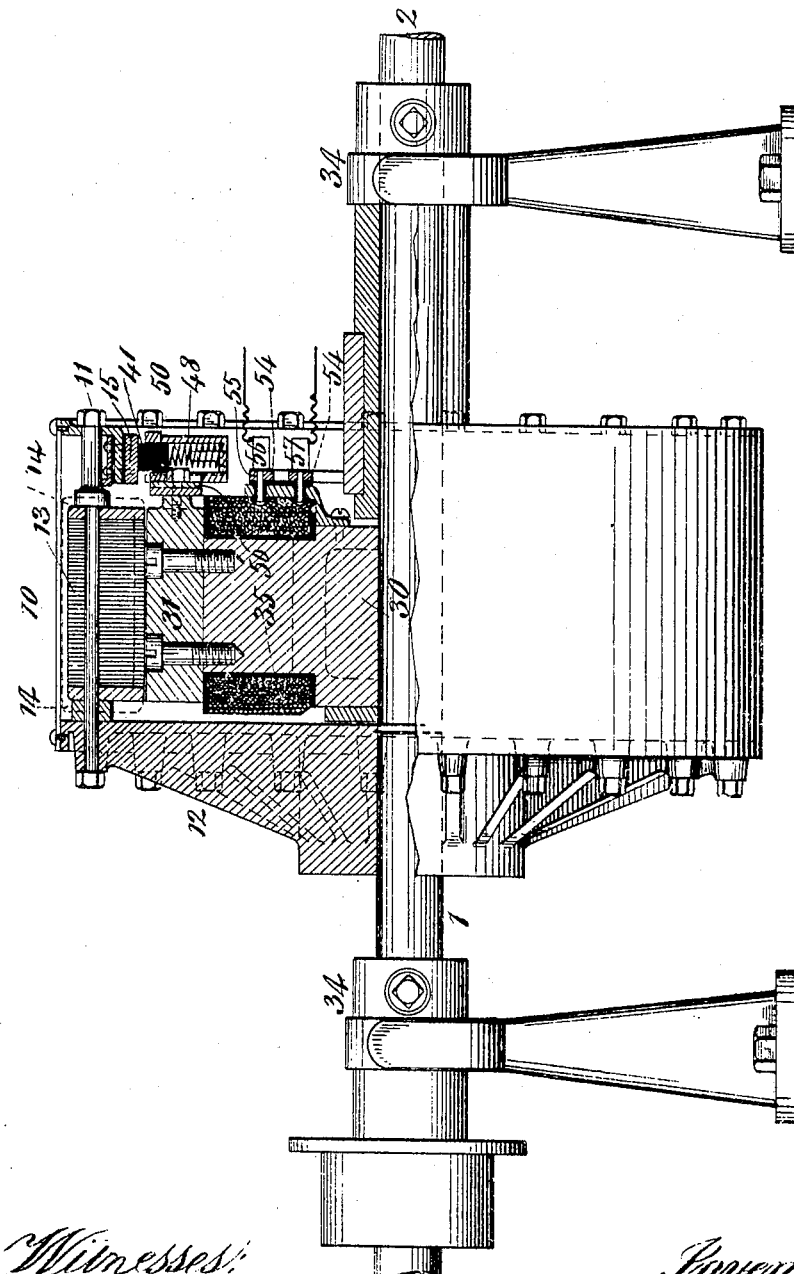

Figure 1 shows in elevation my invention embodied in the driving and driven shafts of a crank-engine, the driven shaft being operatively connected, as by bevel-gears, to the shaft carrying the driving-wheels of an automobile. Fig. 2 is a vertical transverse section showing the upper half of my invention embodied in a driving and a driven shaft, a belt being employed to transmit power to the driving-shaft. Fig. 3 is a side elevation of my invention, parts being broken away to show the arrangement of the armature-windings, steel disks, commutator, segments, brushes, and the field. Fig. 4 is a diagrammatic view showing the electrical circuits, commutators, brushes, and rheostat employed in connection with the pole-pieces of armature and field of my invention.

In the drawings illustrating the principles of my invention and the best modes now known to me of embodying those principles a driving-shaft 1 and a driven shaft 2 are mounted in suitable bearings 34 and have a common longitudinal axis. Upon the end portion of one shaft—say the driving-shaft—is mounted and made fast thereto an armature 10—say a Gramme-ring internal-slotted armature—and upon the adjacent portion of the driven shaft 2 is a field 30—say of the multipolar or four-pole construction—which is inclosed by the armature 10.

The armature 10, made fast by bolts 11 to a sustaining-disk 12, which in turn is fast on the driving-shaft 1, consists of a series of steel disks 13, armature-coils 14, which are electrically connected with commutator-segments 15, that move with armature and are insulated from each other. The field 30 has four pole-pieces 31, 32, 33, and 34, provided with opposite windings 35, 36, 37, and 38. It also has carbon brushes 39, 40, 41, and 42, which are electrically connected by wires 43 44, the brushes being mounted in their respective brush-holders 45 46 47 48, which in turn are mounted upon a brush-ring 50. This ring 50 has a slot 51, in engagement with which is a threaded pin 52, provided with a nut 53, by means of which the brush-ring 50, and consequently the brushes 39, 40, 41, and 42, may be adjustable in their relations to the armature 10 and the field 30. There are two collector-rings 54 55 so placed and secured to the field 30 that by means of stationary brushes 56 57 these collector-rings can be electrically connected with a suitable variable resistance—such, for example, as a rheostat 60—under the control of the operator.

Reference now being had to Fig. 4, which shows diagrammatically the electrical circuits and means employed to control the electrical currents in the circuits, the operation of my invention will become obvious. Driving-shaft 1 is driven from any suitable source of power, and armature 10 is thus caused to rotate around field 30. An electrical current is induced in the armature, which current then in turn passes through windings 35 36 37 38 of the field 30 and is there utilized to energize the field, with the result that the attraction created between armature 10 and the field 30 causes the field to follow armature in the direction of the arrow. As the currents in the field and armature will be readily understood from an examination of Fig. 4, a description of their courses therethrough is not necessary and will therefore be omitted. By varying the intensity of the current generated in armature 10 by the introduction of a resistance into the circuit, such as by the use of a rheostat 60, the intensity of the magnetic field is varied, and hence there is a variation in magnetic field 30, and consequently a variation between the number of revolutions of the driving-shaft 1 and the number of the driven shaft 2. This variation in the intensity of the electrical current may be brought about also by an adjustment of the brush-ring 50, and hence the adjustment of the brushes 39 40 41 42 in their relations to the armature 10 and the field 30, or by so winding the field with one or more coils wound upon each field-pole having separate circuits whereby one or more of these coils can be connected in series or in multiple for the purpose of varying the ampere-turns of the field, and thereby varying the intensity of the magnetic field and the consequent torque, all of which means are well-known equivalents.

In fine, as above stated, while my invention is very useful when employed with a gasolene-engine, the balance-wheel of which is either the field or armature mounted on the driving-shaft, obviously my invention can be used to connect operatively any driving-shaft and any driven shaft regardless of the kind of power employed to drive the driven shaft. There is no mechanical friction. The speed of one shaft can at the will of the operator be varied from that of the other shaft, and there is no shock transmitted to the driven shaft upon a sudden starting of the driving-shaft, all of which benefits flow from the substitution for mechanical connections the magnetic connections embodied in my invention.

My invention may be applied in different forms without departing from the principles thereof, and I therefore do not limit my invention to the particular construction shown and described; but I desire to protect it in the broadest manner legally possible.

What I claim is—

A driving-shaft; a driven shaft; a multipolar field, and an internal-slotted armature; one shaft being fixed to the field, and the other shaft fixed to the armature; commutator-segments fixed to and electrically connected with the armature-coils; a multiplicity of brushes to engage these segments, each brush being fixed to the field and between its adjacent pole-pieces; and electrical connections, whereby the windings of the armature are short-circuited through the brushes of the commutator, and the windings on the pole-pieces of the field, and poles are formed in the armature at the brushes, each pole of the armature attracting one and repelling the other, of its adjacent poles of the field and causing the field to move in the same direction as does the armature.

In testimony whereof I affix my signature in presence of two witnesses.

JOHN OTTO HEINZE, Jr.

Witnesses:
FRANCIS J. V. DAKIN,
E. F. UNIAC.